Patented Mar. 2, 1954

2,671,059

UNITED STATES PATENT OFFICE 2,671,059

ION EXCHANGE RESIN AND METHOD FOR TREATING LIQUIDS

Pieter Smit, Amsterdam, Netherlands, assignor to N. V. Octrooien Maatschappij "Activit," Amsterdam, Netherlands No Drawing. Application December 11, 1945, Serial No. 634,402. In the Netherlands January 25, 1940

Section 1, Public Law 690, August 8, 1946
Patent expires January 25, 1960

10 Claims. (Cl. 260—2.1)

My invention relates to ion exchange resin and method for treating liquids.

One object of my invention consists in the removal of organic materials from liquids and more particularly in the removal of substances giving rise to objectionable colors, odors or tastes.

Another object of my invention aims at recovering valuable constituents such as alkaloids, vitamins, aromatic substances and the like during the treatment.

It is known that some synthetic resins, i. e. organic polymerization or condensation products, possess ion exchanging properties and are used for this purpose commercially. Since the exchange capacity per unit of volume is of the highest importance for ion exchangers, the volume weight of these ion exchanging synthetic resins has been made as high as possible. To this end the resins were formed from as highly concentrated solutions as possible and the polymerized product so obtained was intensively dried. In this way a high weight of solid matter per unit of volume is obtained.

I have found that many synthetic resins can be successfully used for the removal of organic materials, such as large organic complexes, from liquids provided that these resins have a polar character. Polarity is a well-known phenomenon and polarity in resins can be obtained by introducing into the molecules of the synthetic resins amino, imino, sulfo, carboxyl and many other active substituent groups.

These resins are made particularly suitable for the removal of organic material if during their preparation the resin components are diluted in such a way and the artificial resins obtained are dried, if at all, only partially so that one liter of the grained synthetic resin contains no more than 500 and preferably not more than 400 grams of dry substance.

It has been discovered that in artificial resins having this relatively small volume weight the ion exchanging qualities, if present, are strongly reduced, but the adsorption capacity is highly developed. Also even after the ion exchanging properties have been exhausted by saturation these synthetic resins are still capable of removing organic compounds from liquids.

In case, however, that the weight of dry substances present in one liter of granular synthetic resin amounts to more than 400 grams the adsorption capacity for organic materials generally becomes lower.

According to my invention organic materials can be removed from liquids by treatment with synthetic resins, containing polar groups. Examples of organic materials which can be removed in this way are coloring matters or substances giving rise to odors or flavors. On the other hand these synthetic resins after being saturated with the organic material to be removed or to be recovered can be easily regenerated by contact with a solution of an electrolyte and in this way valuable organic materials adsorbed by the resin can be easily recovered.

The polar artificial resins to be used in practice for the adsorption purposes according to my invention, should fulfill certain conditions. In the first place they must evidently be practically insoluble in the liquid under treatment and in the regeneration liquid, even though these liquids are heated. An appreciable solubility would cause contamination of the liquid under treatment by the resin going into solution in this liquid.

A further condition is that the synthetic resins have good mechanical and chemical resistance, so that they do not abrade and retain their shape. This may be effected by interrupting the condensation of the resin during its preparation at a suitable moment.

Moreover it is necessary that the synthetic resin be wet by the liquid to be treated. Hence if aqueous liquids are treated the resin must be hydrophilic, if oily liquids are under the treatment the resin must be carbophilic. Finally it is desirable that the resins be capable of being regenerated without it being necessary to apply too large an excess of chemicals. For these reasons a condensation product such as e. g. aniline black (obtained by oxidation of aniline) is unsuitable for use in aqueous liquids on account of its solubility.

Very suitable for the purposes of this invention are synthetic resins with a volume weight of not more than 400 grams dry weight per liter (e. g. 200–400 grams per liter) which are prepared by condensation of compounds having amino, imino, sulfo, hydroxyl, carboxyl or other active groups or several of these groups.

Care should be taken that the polar synthetic resins used according to my invention possess for every special purpose such an adsorption power that they effect the removal of definite compounds from liquids. A polar resin giving under certain conditions or for specific liquids a favorable result may be a failure under different conditions or for other liquids. E. g. the artificial resins, prepared from meta phenylene diamine and formaldehyde according to Examples I and III are excellent for the decolorization of aqueous liquids with a pH-value higher than 7, while the artificial resins prepared from resorcinol, meta phenylene diamine and formaldehyde according to Example V, as well as the resin prepared from pyrogallol and formaldehyde according to Example IV, are particularly suitable for liquids with a pH-value below 7.

Therefore it is highly desirable to determine for every liquid to be treated which polar synthetic resin gives the optimal results. This can be easily accomplished by a series of preliminary experiments on a small scale.

Often the use of different polar artificial resins either simultaneously or successively is advantageous, because each of these resins removes different impurities from the liquid under treatment. On the other hand a homogeneous mixture of various polar synthetic resins or mixed resins may be obtained by suitable polymerization of various resin-forming materials.

It is a well-known fact that the activity of adsorbents depends not only on the area of their surfaces but is also determined by the presence of certain active groups. These groups are different for water and for oil, for coloring matters and for colloids. In aqueous media polar groups such as the above mentioned groups, show a great activity, in oil mostly other groups are effective.

In one and the same artificial resin positive as well as negative polar adsorption capacity may be present. By choosing suitable components during the condensation of the resins one is able to increase or to diminish specific polar capacities.

Generally speaking the synthetic resins produced from aldehydes or substances having an aldehyde character and cyclic compounds having amino and/or imino groups or hydroxyl groups such as aniline, resorcinol and pyrogallol, are most suitable. In these resins the components may occur in various proportions.

Also other artificial resins are suitable, e. g. urear or thiourea or alkyd resins and even natural products in which polar groups have been introduced e. g. aminorubber.

In order to diminish the solubility or to increase the polarity sulfo and carboxyl groups and aliphatic chains may be introduced during the condensation or coupling may take place with other groups, e. g. diazo groups.

The medium in which the polymerization takes place is of great importance in connection with the above mentioned conditions. It can be effected in acid or in alkaline media. The presence of sulfites, alkylating agents or certain catalysts may have a favorable effect.

Hitherto it has been conventional in the preparation of synthetic resins to wash and then dry the resin obtained. By drying the resin is obtained in the form of a solid substance of dense structure and is rendered insoluble.

According to my invention the requirements of good resistance and low solubility are important but for the application of this invention intensive drying of the resin must be avoided, because the adsorbing and purifying capacity of the resins is strongly reduced or even practically destroyed by drying.

Preferably drying of the resin is therefore totally avoided according to my invention or at most is restricted to the removal of only part of the liquid present in the synthetic resin, e. g. by exposure to an air current. The resin does not shrink by drying in the air. At all events drying if applied must not be so intense, that the volume weight of the resin becomes more than 400 grams of dry substance per liter of synthetic resin.

The volume weight of the artificial resin is also influenced by the dilution of the medium in which the resin is formed. By a suitable dilution of this medium i. e. by conducting the condensation in the presence of a large excess of water, a high-volume condensation product is obtained having a predetermined capillarity and adsorption.

In general polymerization in a more dilute medium gives a synthetic resin which is more suitable for the removal of the larger complex molecules.

If desired the resin may be supported on suitable carriers.

In some cases it is advantageous to treat the synthetic resin mass obtained by polymerization or condensation, preferably after bringing it into granular form, with an alkaline liquid. This is recommended in those cases wherein the resins are too soft or too soluble and by this operation the resins are hardened or cured. This curing by means of alkaline liquids replaces drying by which, in the ordinary processing of synthetic resins, these products are cured.

By variation of the above mentioned factors (suitable choice of the resin constituents, introduction of active groups, polymerization medium, dilution and after-treatment) synthetic resins having a volume weight not higher than 400 grams of dry substance per liter of resin may be prepared, which give optimal results for any particular adsorption application.

It is evident that one may determine by preliminary experiments which polar artificial resin possesses optimal adsorption capacity in the particular liquid to be treated.

After the adsorption the synthetic resins can be regenerated by means of alkalies and/or acids. To this end solutions of strong mineral acids, of sodium hydroxide, of ammonia, of lime, etc. are used. The acid solutions mainly effect the removal of adsorbed inorganic salts, such as calcium, iron and manganese compounds from the resin. Alkaline solutions remove coloring matter, decompose adsorbed proteinic material, etc. However, acid solutions also partially accomplish these results. The acid and alkaline regenerating solutions can be applied successively. In comparison with the regeneration of ion exchangers, which is effected very quickly, the regeneration of the present resins often requires a good deal of time, even at increased temperatures.

If desired the adsorbed organic substances can be recovered, particularly if they are valuable products such as alkaloids, vitamins and the like.

To this end a regeneration solution is used, which does not decompose the adsorbed substance to be recovered and from this solution the valuable substances can be easily separated in known ways.

The invention is further illustrated by means of the following specific examples:

*Examples of resin preparation*

I. 12 kg. of meta phenylene diamine are dissolved in 45 liters of water and 9 liters of 30% hydrochloric acid. To this solution 20 liters of a 40% formalin solution are added.

The mixture is quickly and vigorously agitated and solidifies to a homogeneous mass. After standing for 24 hours the mass is rubbed through a 2 mm. mesh sieve, boiled in water and introduced into a warm 10% sodium hydroxide solution in order to cure the resin.

After another 24 hours the synthetic resin is washed with water, mixed with a 10% hydrochloric acid solution and again washed with water.

The product so obtained is now ready for adsorption, particularly in alkaline aqueous liquids.

Preferably care is taken during storage of this product to prevent it from drying so that the volume weight remains below 400 grams of dry substance per liter.

II. The procedure is the same as in Example I but instead of 45 liters, 90 liters of water are used.

The resin so obtained not only adsorbs acid substances, but also alkaline and neutral compounds and coloring matters.

III. The procedure is the same as in Example I but instead of 45 liters, 150 liters of water are used.

This resin is excellent for the adsorption of coloring matter from aqueous solutions, having a pH-value of more than 7.

IV. 10 kg. of pyrogallol and 3 kg. of sodium carbonate are dissolved in 35 liters of water and 20 liters of formalin solution (40%) are added.

After mixing and heating the mass solidifies.

After standing for 6 hours this mass is granulated as described in Example I and then washed.

The artificial resin so obtained is particularly suitable for the treatment of aqueous solutions having a pH-value below 7.

V. 6 kg. of resorcinol, 6 kg. of meta phenylene diamine and 4 kg. of sodium hydroxide are dissolved in 45 liters of water and 20 liters of a 40% formalin solution are added. After mixing the mass solidifies and is further treated as in Example I.

Also this resin is suitable for treatment of liquids having a pH-value below 7.

All the resins prepared according to the preceding examples have a volume weight below 400 grams of solid per liter of resin.

*Examples of use*

VI. Beet molasses is diluted to 65° Brix and percolated over one of the resins prepared according to one of the preceding examples in such manner that 10 parts by weight of solid substance present in the liquid pass over one part by weight of resin. The temperature is held at 60–70° C. and the duration of the contact is approximately 1 hour.

In all cases an important decoloration is obtained, varying between 30–70%.

The synthetic resins of Examples I, II and III decolor per unit of volume approximately in the same degree but decolor more strongly than the resins prepared by Examples IV and V.

Regeneration is conducted with a 5% HCl solution and after washing with a 5% NaOH or NH₃ solution.

When cane-molasses is treated the artificial resin prepared according to Example III is the best decolorizing agent. It is clear that molasses contains coloring matter having such large molecules that only the resin of Example III is capable, by virtue of its large capillaries, of producing satisfactory adsorption of this coloring material.

VII. A sugar solution of crude beet sugar at 65° Brix is percolated over a filter provided with the resin prepared according to Example II. A well purified refining liquid is obtained. The regeneration takes place as in Example VI but the acid treatment is not effected during each regeneration but only after two adsorption treatments of the sugar solution.

VIII. Ground water having a color according to the platinum-scale of 50 is subjected to aeration and filtration and then percolated over one of the synthetic resins prepared according to Examples I–V. The color, smell and taste are improved by contact with these resins and the content of organic matter is considerably diminished. The resin prepared according to Example II appears to give the best decolorization, the average color of the percolate is below 5, even after 10,000 parts by weight of water have been percolated over 1 part by weight of synthetic resin. With regard to the decolorization capacity the best results are obtained with synthetic resins in the following order, i. e. resins of Examples II, I, IV and V. Regeneration is effected by means of a HCl and a NaOH solution.

IX. Purified river water with a color of 9 and a potassium permanganate value of 11 is percolated over a synthetic resin prepared according to Example II. 5 liters of water pass over one liter of resin per hour.

After one week the color is 2 and the potassium permanganate value only 3. However, the ion exchange capacity of the resin is exhausted.

The organic matter which can be assimilated by bacteria is removed as well as traces of substances necessary for algae growth. Neither bacterial growth nor algae growth can take place in water purified in this way.

X. A strongly colored distilled glycerol is treated as described in Example IX. A completely clear filtrate is obtained.

XI. 10 parts by weight of a hydrophobic urea methanal resin is prepared in such a way that it contains no more than 400 grams of dry substance per liter of resin. This resin is heated with 15 parts by weight of thin mineral oil at 150–200° C. until the mass gelatinizes.

The resin mass so obtained effectively decolors mineral oils at 75–100° C.

I claim:

1. In the removal of large organic complexes from liquids, the process which comprises passing a liquid containing such complexes in contact with a formaldehyde-meta-phenylene diamine condensation product having a weight per liter of less than 400 grams on the dry basis, said condensation product being produced by condensing formaldehyde with meta-phenylene diamine in a large excess of water sufficient to produce a resin having a weight per liter less than 400 grams on the dry basis and curing said resin in the presence of an aqueous medium.

2. The process of claim 1 wherein the liquid treated is a molasses.

3. Process for the removal of impurities of organic nature from a molasses solution which comprises contacting said solution with an undried resin resulting from the condensation of formaldehyde and meta-phenylene diamine in the presence of a quantity of water sufficient to provide desired porosity and maintaining said resin in a moist condition until said contact is effected.

4. In the removal of organic complexes from liquids, the process which comprises passing a liquid containing large organic complexes in contact with a polar synthetic resin having a weight per liter of less than 400 grams on a dry basis and formed by the condensation, in a large excess of water, of formaldehyde with an ion exchange resin-forming compound selected from the class consisting of meta-phenylene diamine, aniline, resorcinol and pyrogallol, sufficient water being present to produce a resin having a weight per liter of less than 400 grams on a dry basis, and curing said resin in the presence of an aqueous medium.

5. The process of claim 4 wherein the cured resin is maintained in a moist condition until contact with said liquid is effected.

6. A synthetic undried resin suitable for use in the removal of large organic complexes from liquids with which it is contacted, comprising the condensation product of formaldehyde with a resin-forming compound, selected from a class consisting of aniline, meta-phenylene diamine, resorcinol and pyrogallol, in a large excess of water, sufficient to produce a resin having a weight per liter of less than 400 grams on the dry basis and having pores of a size effective to remove said large organic complexes from liquids with which it is contacted, said resin being cured in the presence of an aqueous alkaline medium and being maintained thereafter in a moist condition.

7. A synthetic undried resin suitable for use in the removal of large organic complexes from liquids with which it is contacted, comprising the condensation product of formaldehyde and m-phenylene diamine condensed in the presence of a large excess of water sufficient to produce a resin having a weight per liter of less than 400 grams on the dry basis and having pores of a size effective to remove said large organic complexes from liquids with which it is contacted, said resin being cured in the presence of an aqueous alkaline medium and being maintained thereafter in a moist condition.

8. In the preparation of synthetic resins suitable for the treatment of liquids for the removal therefrom of large organic complexes, the process which comprises mixing together and condensing formaldehyde and a synthetic resin-forming compound, selected from a class consisting of aniline, meta-phenylene diamine, resorcinol and pyrogallol, in the presence of a large excess of water sufficient to produce a resin having a weight per liter of less than 400 grams on the dry basis and whose pores are of a size effective to remove said large complexes from said liquids, curing said resin in the presence of an aqueous alkaline medium and thereafter maintaining it in a moist state until it is used.

9. In the preparation of synthetic resins suitable for the treatment of liquids for the removal therefrom of large organic complexes, the process which comprises mixing together and condensing formaldehyde and meta-phenylene diamine, in the presence of a large excess of water sufficient to produce a resin having a weight per liter of less than 400 grams on the dry basis and whose pores are of a size effective to remove said large complexes from said liquids, curing said resin in the presence of an aqueous alkaline medium and thereafter maintaining it in a moist state until it is used.

10. A synthetic undried resin suitable for use in the removal of large organic complexes from liquids with which it is contacted, comprising the condensation product of formaldehyde with a resin-forming compound selected from a class consisting of aniline, meta-phenylene diamine, resorcinol and pyrogallol, in a large excess of water, sufficient to produce a resin having a weight per liter of less than 400 grams on the dry basis and having pores of a size effective to remove said large organic complexes from liquids with which it is contacted, said resin being maintained in moist condition without drying from its time of formation until said contact is effected.

PIETER SMIT.

References Cited in the file of this patent

UNITED STATES PATENTS

| Number | Name | Date |
| --- | --- | --- |
| 2,198,874 | Holmes | Apr. 30, 1940 |
| 2,226,134 | Liebknecht | Dec. 24, 1940 |
| 2,285,750 | Swain | June 9, 1942 |
| 2,290,345 | Melof | July 21, 1942 |
| 2,333,142 | Behrman | Nov. 2, 1943 |
| 2,341,907 | Cheetham | Feb. 15, 1944 |
| 2,373,549 | D'Alelio | Apr. 10, 1945 |
| 2,388,235 | Bowman | Nov. 6, 1945 |

FOREIGN PATENTS

| Number | Country | Date |
| --- | --- | --- |
| 489,173 | Great Britain | Jan. 1937 |